Aug. 25, 1964 W. H. MARKWOOD, JR 3,146,284
PROCESS FOR MAKING POLYPROPYLENE FILM
Filed Sept. 16, 1960
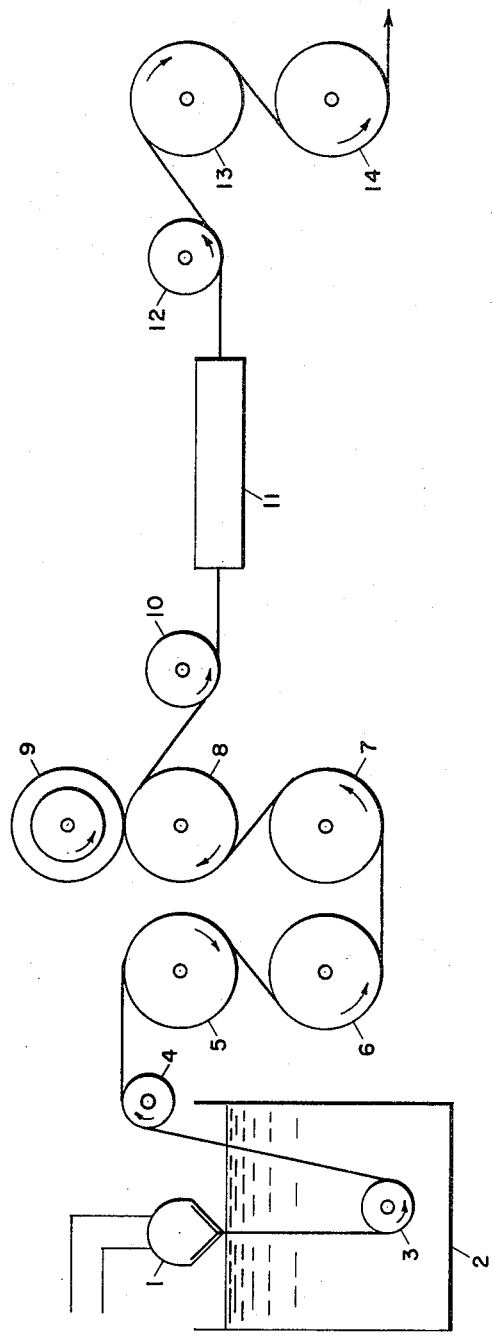
WILLIAM H. MARKWOOD JR.
INVENTOR.
BY Ernest G. Peterson
AGENT.

United States Patent Office 3,146,284
Patented Aug. 25, 1964

3,146,284
PROCESS FOR MAKING POLYPROPYLENE FILM
William H. Markwood, Jr., Wilmington, Del., assignor to Hercules Powder Company, Wilmington, Del., a corporation of Delaware
Filed Sept. 16, 1960, Ser. No. 56,418
3 Claims. (Cl. 264—210)

The present invention relates to a process for making film of stereoregular polypropylene.

Many crystalline, organic, thermoplastic polymers such as poly(ethylene terephthalate), poly(hexamethyleneadipamide), poly(vinylidene chloride), and the like find one of their greatest uses as raw materials for the manufacture of clear oriented films. One of the commonly used processes for the manufacture of oriented films from such polymers, which may be termed the tenter process, comprises extruding a molten film of the polymer, rapidly quenching the molten film to a relatively low temperature, imparting linear orientation to the quenched film by stretching it by passage over rolls rotating at different speeds while heating the film between the rolls, and imparting transverse orientation to the film by stretching it, also while at an elevated temperature, by means of a tenter. This may be followed by restretching in the linear direction to tensilize the film.

Another process known as the tubular process comprises extruding a molten film in the form of a tube, quenching the film to a relatively low temperature, blowing air inside the tube, while simultaneously heating it, to inflate the tube and thereby stretch it in both the linear and transverse directions. This process, too, may be followed by one or more additional stretching steps to obtain a film having a desired combination of properties.

One of the newer polymers that offers promise in the manufacture of film is stereoregular polypropylene, a highly crystalline thermoplastic polymer that melts in the range of about 165–172° C. However, when it is attempted to process this polymer into film by the above described processes, considerable difficulty is invariably encountered in processing the film after its initial orientation. More specifically, in the tenter process if the extruded film is quenched to a relatively low temperature and then linearly oriented by stretching between rolls rotating at different speeds while applying heat to the film in its span between the rolls, the film cannot thereafter be tentered or redrawn linearly without frequent wrinkling, splitting, or loss of initial orientation. Similarly, in the tubing process, the film after its initial blowing cannot be restretched in either direction without encountering the same difficulties.

This invention is directed to a simplified process for making biaxially oriented film from stereoregular polypropylene which is characterized by the step of pulling a molten film of polymer away from the die through which the film is extruded to impart linear orientation to the film. More particularly, the process of the invention comprises the steps of extruding a molten film of polypropylene through a slot die at a temperature below about 290° C., pulling the molten film of polymer away from the die at a linear speed at least about three times the linear rate of extrusion to impart linear orientation thereto, quenching the film to a temperature below about 40° C. within a distance of about ⅛ to 3 inches from the die, reheating the film to a temperature within the range of about 95° to 160° C., and stretching the film transversely to impart transverse orientation thereto. When it is desired to produce biaxially oriented film of maximum strength in each direction, the process can include the additional step of stretching the film in the linear direction to increase the amount of linear orientation.

One of the attributes of the process of the invention is that once linear orientation has been achieved in the prescribed manner and the film quenched to below about 40° C., the film can subsequently be stretched in either or both planar directions without loss of its initial linear orientation and without splitting or wrinkling. The reason for this advantage in contradistinction to most of the prior art processes is not fully understood. However, it is believed that it is at least in part due to the formation in the initial steps of the process of a crystal structure that is different from that formed in the initial stages of conventional processes.

The process will be described still more specifically by reference to the attached drawing which is a diagrammatic illustration of a preferred embodiment of the invention. In the drawing, 1 represents an extruder provided with a slot die that is capable of extruding a flat, molten film of polymer. Beneath the extruder is a receptacle 2 which is filled to a level closely beneath the die with an inert liquid. Elements 3 and 4 are idler rolls. Numerals 5, 6, 7 and 8 designate power-driven rolls that are capable of rotating at speeds considerably faster than the rate at which molten film is extruded. Just above roll 8 is a rubber covered pinch roll 9. Roll 10 is an idler roll which guides the film into tenter 11. Numeral 12 designates an idler roll which is followed in sequence by power-driven rolls 13 and 14 that can be employed to stretch the film linearly after it has been tentered. Conventional edge-trimming and windup devices which are normally used to trim and wind the film as it leaves the tenter or roll 14 are not shown.

In the operation of the apparatus shown in the drawing, a molten film of stereoregular polypropylene is extruded through the die and pulled away from the die into the liquid contained in the receptacle 2 where it is quenched immediately upon contacting the liquid. The quenched film is guided down into the bath via roll 3, then out of the bath via roll 4 onto the power-driven rolls 5, 6, 7 and 8 which in accordance with the invention rotate at a speed at least about three times the rate at which the molten film is extruded and thus provide the energy for pulling the film away from the die. Rubber covered idler roll 9 provides pressure on the film as it passes over the top of roll 8, thus increasing the friction at this point and preventing slippage of the film on the rolls. After leaving roll 8 the film, which at this point is linearly oriented, passes under roll 10 and thence in a horizontal direction into tenter 11. In tenter 11 the film is heated and stretched in the transverse direction to impart transverse orientation to the film. Upon leaving the tenter the film can be edge-trimmed and wound as a finished biaxially oriented film. However, when maximum tensile strength in the linear direction is desired, it is necessary to stretch the film linearly after it has been stretched transversely. Therefore, as an optional step of the invention, the film can be stretched linearly via rolls 13 and 14. To accomplish this, the film emerging from the tenter is passed under idler roll 12 onto heated power-driven roll 13 which rotates at a peripheral speed approximately the same as the speed of the tenter, and thence onto cold power-driven roll 14 which rotates faster than roll 13 and stretches the film in its passage between the two power-driven rolls.

The process of the invention will be illustrated more specifically by the following examples in which parts and percentages are by weight unless otherwise specified. The stereoregular polypropylene employed in the examples was a highly crystalline polymer having a birefringent melting point of about 170° C. and reduced specific viscosity of 3 in Example 1, and 5 in Example 2, the reduced specific viscosity being the specific viscosity, as determined on a 0.1% solution of the polymer in decahydronaphthalene at 135° C., divided by the concentration of the solution.

*Example 1*

Molten stereoregular polypropylene was extruded through a slot die 6 inches long and 0.01 inch wide at a temperature of 232° C. at a linear extrusion rate of 4 ft./min. The molten film was pulled away from the die at the rate of 24 ft./min. into a bath of ice water (4° C.) spaced 0.25 inch from the lips of the die. The quenched and linearly oriented film was then passed to a tenter. The tenter was an enclosed chamber having an over-all length of 12.5 feet. Throughout its length it was provided with 43 rod-type infrared heaters located crosswise to the film about 3½ inches apart and 6 inches above the plane of the film. The heaters were arranged in 6 groups, the temperature of the heaters in each group being controlled independently of the other groups. The speed of the tenter was adjusted to 26 linear feet per minute. In the first 50-inch section of the tenter, the film was heated without drawing, the temperature of a thermocouple located in the center section about one inch above the film being 123° C. In the second 50-inch section of the tenter, the film was further heated and transversely drawn by means of conventional tenter clips to a width 2 times its original width, the temperature of a thermocouple located in the center of the section one inch above the film being 160° C. In the third 50-inch section the film was allowed to cool without further drawing, the temperature of a thermocouple in the center of the section one inch above the film being 60° C.

The film upon leaving the tenter was edge-trimmed and wound. The final film which was 0.0009 inch thick, was uniform and clear. Its physical properties were as follows:

|  | Linear Direction | Transverse Direction |
|---|---|---|
| Tensile strength (p.s.i.) | 11,000 | 10,000 |
| Elongation (percent) | 380 | 250 |
| Tensile modulus (p.s.i.) | 150,000 | 220,000 |

*Example 2*

Molten polypropylene was extruded through a slot die 6 inches x 0.015 inch at a temperature of 288° C. and at a linear extrusion rate of 6.0 ft./min. The molten film was pulled away from the die at a rate of 20 ft./min. into a water bath at 25° C. spaced 0.25 inch away from the lips of the die. The quenched and linearly oriented film was then passed to a tenter. The tenter was identical to that used in Example 1. The tenter speed was adjusted to 21 ft./min. with section 1 at 93° C., section 2 at 121° C. and section 3 at 60° C. as measured by thermocouples located about 1 inch above the film in each section. In the second section the film was transversely drawn to 2.5 times its original width. The drawn film was cooled in the third section of the tenter and the edges trimmed as the film left the tenter.

The film was subsequently fed onto a polished chrome plated roll at 126° C., under sufficient tension to assure good contact and no slippage, and was drawn 2.3 times its tentered length from this hot roll to a similar roll at 25° C. This cold roll was mounted close to the hot roll so that the tangential distance the film traveled from one roll to another was 2 inches.

The resulting film was 0.0003 inch thick, was uniform and clear with the following tensile properties:

|  | Linear Direction | Transverse Direction |
|---|---|---|
| Tensile strength (p.s.i.) | 16,000 | 13,000 |
| Elongation at break (percent) | 70 | 90 |
| Tensile modulus (p.s.i.) | 160,000 | 130,000 |

As the examples have shown, a biaxially oriented film of stereoregular polypropylene can be made by the steps of extruding a molten film of the polymer through a die at a temperature below about 290° C., pulling the molten film away from the die at a linear speed at least about three times the linear rate of extrusion, quenching the film to a temperature less than about 40° C. within a distance of about ⅛ to 3 inches from the die, reheating the film to a temperature within the range of 95° to 160° C., and stretching the film transversely to impart transverse orientation thereto. The process is not only simple but also it offers the advantages of low equipment cost and the ability to produce good quality film at a high rate of speed.

The examples have illustrated typical procedures within the scope of the invention. It is within the skill of the art to select optimum conditions within limits previously assigned and to vary other process conditions according to ultimate film properties desired as will be obvious from the following comments.

Successful operation of the process depends upon close observance of the conditions specified for establishing the initial linear orientation of the film because any serious departure from these conditions can result in a linearly oriented film that cannot subsequently be transversely oriented without much difficulty. Where the conditions are open at one end, as where only a maximum or minimum is specified, the limit at the open end is immaterial. Thus, the extrusion temperature can be any temperature below 290° C. at which it is possible to extrude a molten film of polymer; the maximum rate at which the film is pulled away from the die is governed only by the breaking point of the film; and the quenching temperature is limited on the low side only by the limitations of the means employed for quenching.

Also, the specific means employed for the performance of each of the steps of the process is immaterial. For instance, the means for quenching the film need not be a liquid bath as illustrated but may be a cold rotating roll or other device capable of cooling the film to the prescribed temperature within the recited distance from the die. Similarly, the means for pulling the film away from the die need not be rolls as illustrated but may be any equivalent means capable of the same function.

Having established linear orientation by the pulling away of the film from the die and having quenched the film as above, the film is now amenable to transverse stretching by any conventional means with no other precaution than maintaining the temperature of the film at about 95° to 160° C. during stretching in order to establish transverse orientation. The degree of stretch is determined primarily by the strength desired in that direction and can be any ratio below about 8:1. The stretching can be formed by means of a tenter or any equivalent mechanism.

Because of the fact that the amount of linear orientation that can be imparted to a film by the act of pulling it away from the die and quenching it within a short distance from the die is limited, the tensile strength in the linear direction of films oriented solely in this manner does not approach the maximum for the polymer. Therefore, it is sometimes desirable in order to achieve maximum tensile strength in the linear direction to stretch the film linearly after transverse stretching. This can be done as illustrated in the examples by heating the film by contact with a heated roll and drawing onto a cooled roll.

What I claim and desire to protect by Letters Patent is:

1. The process for making biaxially oriented film of stereoregular polypropylene which comprises extruding a molten film of said polymer through a die at a temperature below about 290° C., pulling said film away from the die at a linear speed at least about three times the rate of extrusion and quenching said film to a temperature below about 40° C. within a distance of from ⅛ to 3 inches from the die whereby there is obtained a film having substantial orientation in the longitudinal direction, reheating the film to a temperature within the range of about 95° to 160° C., and stretching the film transversely while at the latter temperature to orient the film in the transverse direction, thereby obtaining a biaxially oriented film.

2. The process of claim 1 in which the film is quenched by immersion in an inert liquid.

3. The process of claim 1 in which transverse stretching of the film is followed by stretching in the linear direction.

References Cited in the file of this patent

UNITED STATES PATENTS

| | | |
|---|---|---|
| 2,364,435 | Foster et al. | Dec. 5, 1944 |
| 2,627,088 | Alles et al. | Feb. 3, 1953 |
| 2,668,988 | Bailey et al. | Feb. 16, 1954 |
| 2,799,896 | Grow et al. | July 23, 1957 |
| 2,824,090 | Edwards et al. | Feb. 18, 1958 |
| 2,961,711 | Diedrich et al. | Nov. 29, 1960 |
| 2,971,222 | Weissman | Feb. 14, 1961 |
| 2,979,774 | Rusignolo | Apr. 18, 1961 |
| 3,022,543 | Baird et al. | Feb. 27, 1962 |
| 3,059,991 | Munt | Oct. 23, 1962 |

FOREIGN PATENTS

| | | |
|---|---|---|
| 581,390 | Belgium | Feb. 1960 |
| 840,191 | Great Britain | July 6, 1960 |
| 849,436 | Great Britain | Sept. 28, 1960 |
| 627,801 | Canada | Sept. 19, 1961 |
| 1,213,605 | France | Nov. 2, 1959 |
| 108,452 | Pakistan | Nov. 18, 1958 |

OTHER REFERENCES

Doyle: "Extrusion of Clear Film from High Density Polyethylene," from SPE Journal, June 1958, pp. 35–39.